US012595915B2

(12) United States Patent
Wang et al.

(10) Patent No.: US 12,595,915 B2
(45) Date of Patent: Apr. 7, 2026

(54) GAS VALVE AND OVEN

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Wang Wang, Foshan (CN); Hu Jin, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 712 days.

(21) Appl. No.: 17/352,356

(22) Filed: Jun. 21, 2021

(65) Prior Publication Data

US 2021/0396392 A1    Dec. 23, 2021

(30) Foreign Application Priority Data

Jun. 19, 2020    (CN) .......................... 202010566986.4

(51) Int. Cl.
| | |
|---|---|
| *F24C 3/12* | (2006.01) |
| *A21B 3/00* | (2006.01) |
| *F16K 11/22* | (2006.01) |
| *F16K 11/24* | (2006.01) |
| *F16K 27/00* | (2006.01) |
| *F16K 31/06* | (2006.01) |

(52) U.S. Cl.
CPC ................ *F24C 3/122* (2013.01); *A21B 3/00* (2013.01); *F16K 11/22* (2013.01); *F16K 11/24* (2013.01); *F16K 27/00* (2013.01); *F16K 31/0603* (2013.01)

(58) Field of Classification Search
CPC .... F16K 27/003; F24C 3/122; Y10T 137/265; Y10T 137/5987; F23K 5/005

USPC ......................................................... 431/279
See application file for complete search history.

(56) References Cited

U.S. PATENT DOCUMENTS

| | | | | |
|---|---|---|---|---|
| 2006/0060253 A1* | 3/2006 | Yoshida | .............. | F16K 31/0655 137/884 |
| 2013/0153041 A1* | 6/2013 | Kucera | .............. | G05D 16/2033 137/487.5 |
| 2020/0333003 A1* | 10/2020 | Zhou | ....................... | F23N 1/005 |

FOREIGN PATENT DOCUMENTS

| | | |
|---|---|---|
| CN | 201196278 Y | 2/2009 |
| CN | 204127395 U | 1/2015 |

(Continued)

OTHER PUBLICATIONS

KR20030025637A_ Translation, 2003.*

(Continued)

*Primary Examiner* — Steven B McAllister
*Assistant Examiner* — John E Bargero
(74) *Attorney, Agent, or Firm* — K&L Gates LLP

(57) ABSTRACT

The disclosure discloses a gas valve and an oven, where the gas valve includes an intake valve assembly and at least two outlet valve assemblies, the intake valve assembly includes an intake valve body and an intake valve core, the intake valve body is internally provided with a gas inlet, the intake valve core is configured to control the gas inlet to be opened or closed, each outlet valve assembly includes an outlet valve body and an outlet valve core, each outlet valve body is internally provided with a gas outlet, the gas outlet is respectively communicated with the gas inlet, and the outlet valve core is respectively configured to control the corresponding gas outlet to be opened or closed.

8 Claims, 5 Drawing Sheets

(56)                         References Cited

FOREIGN PATENT DOCUMENTS

| CN | 205173573 | U |   | 4/2016 |            |
|----|-----------|---|---|--------|------------|
| CN | 212297759 | U |   | 1/2021 |            |
| KR | 20030025637 | A | * | 3/2003 | ........... F16K 27/003 |
| KR | 200439044 | Y1 |   | 3/2008 |            |
| KR | 20180032824 | A |   | 4/2018 |            |

OTHER PUBLICATIONS

First OA received in CN Application No. 202010566986.4; mailed Jul. 31, 2024.
Basic organic chemical process and equipment; By Qiu, Yuantao.

* cited by examiner

A-A

Left ◀————▶ Right

B-B

GAS VALVE AND OVEN

CROSS-REFERENCES TO RELATED APPLICATIONS

The present application claims benefit of Chinese Application No. 202010566986.4, filed on Jun. 19, 2020, the contents of which are hereby incorporated by reference in its entirety.

FIELD

The present disclosure relates to the field of oven technologies, and more particularly, to a gas valve and an oven.

BACKGROUND

In the related art, a gas valve is generally used in a gas oven to control a gas pipeline, to control a burner for heating an inner cavity of the gas oven. An existing gas oven is generally provided with two or more burners in the cavity, and the gas valve needs to control gas circuits of burners. According to an existing structure, the gas circuits are generally controlled through one valve only, thus having a low safety coefficient, and gas circuits have a poor pressure consistency, thus being not suitable for high-power burners.

SUMMARY

The present disclosure aims to deal with at least one of the problems in the prior art. Therefore, the present disclosure provides a gas valve for controlling gas circuits of burners and ensuring a pressure consistency of gas circuits, thus having a high safety coefficient.

The present disclosure further provides an oven with the above gas valve.

According to the embodiments of the present disclosure, a gas valve includes: an intake valve assembly, where the intake valve assembly includes an intake valve body and an intake valve core, the intake valve body is internally provided with a gas inlet, and the intake valve core is configured to control the gas inlet to be opened or closed; and at least two outlet valve assemblies, where each outlet valve assembly includes an outlet valve body and an outlet valve core, each outlet valve body is internally provided with a gas outlet, the gas outlet is respectively communicated with the gas inlet, and the outlet valve core is respectively configured to control the corresponding gas outlet to be opened or closed; and the intake valve body is connected with the outlet valve body and is formed with a valve cavity, the gas outlet is communicated with the gas inlet through the valve cavity, and the gas outlet is arranged around a periphery of the valve cavity.

According to the embodiments of the present disclosure, the gas valve at least has the following beneficial effects.

The intake valve assembly with the intake valve body and the intake valve core, and the outlet valve assembly with the outlet valve body and the outlet valve core are arranged, the intake valve body is connected with the outlet valve body and is formed with the valve cavity, the gas outlet is communicated with the gas inlet through the valve cavity, and the intake valve core and the outlet valve core respectively control the gas inlet and the gas outlet to be opened and closed, and gas circuits of burners are all subjected to dual control through the intake valve core and the outlet valve core, thus having a high safety coefficient; and moreover, gas outlets are arranged around the periphery of the valve cavity, and a difference of distance between each gas outlet and each gas inlet is small, and each gas outlet has a good pressure consistency, thus being suitable for high-power burners.

According to some embodiments of the present disclosure, a linear distance between the gas inlet and each gas outlet is defined as a gas transmission length, and a difference between any two gas transmission lengths is less than or equal to a value of any gas transmission length.

According to some embodiments of the present disclosure, the intake valve body and the outlet valve body are of an integrated structure.

According to some embodiments of the present disclosure, the intake valve body and the outlet valve body are located in a same plane.

According to some embodiments of the present disclosure, three outlet valve assemblies are provided, and the three outlet valve assemblies and the intake valve assembly are distributed in a Tin-word format.

According to some embodiments of the present disclosure, the intake valve body is provided with an intake valve mounting position and an intake interface, the intake valve core is mounted on the intake valve mounting position, and two ends of the intake valve core are respectively communicated with the gas inlet and the intake interface.

According to some embodiments of the present disclosure, each outlet valve body is provided with an outlet valve mounting position, the outlet valve core is correspondingly mounted on the outlet valve mounting position, and two ends of the outlet valve core are respectively communicated with the gas outlet and the valve cavity.

According to some embodiments of the present disclosure, an outlet cavity communicated with the gas outlet is defined in the outlet valve body, and a side wall of the outlet cavity extends outwardly and is provided with an outlet interface.

According to some embodiments of the present disclosure, the intake valve core and the outlet valve core are both electromagnetically controlled.

According to the embodiments of the present disclosure, an oven includes the gas valve according to the above embodiments.

According to the embodiment of the present disclosure, the oven at least has the following beneficial effects.

The intake valve assembly with the intake valve body and the intake valve core, and the outlet valve assembly with the outlet valve body and the outlet valve core are arranged through the gas valve, the intake valve body is connected with the outlet valve body and is formed with the valve cavity, the gas outlet is communicated with the gas inlet through the valve cavity, and the intake valve core and the outlet valve core respectively control the gas inlet and the gas outlet to be opened and closed, and gas circuits of burners are all subjected to dual control through the intake valve core and the outlet valve core, thus having a high safety coefficient, and improving a safety performance of the oven; and moreover, gas outlets are arranged around the periphery of the valve cavity, and a difference of distance between each gas outlet and the gas inlet is small, and each gas outlet has a good pressure consistency, thus being suitable for high-power burners.

Embodiments of the present disclosure will be explained in part in the following description, which can be apparent from the following description or be understood through practice of the present disclosure.

BRIEF DESCRIPTION OF THE DRAWINGS

The above and/or embodiments of the present disclosure will be apparent and easily understood from the description of the embodiments with reference to the following accompanying drawings.

Figure 1:
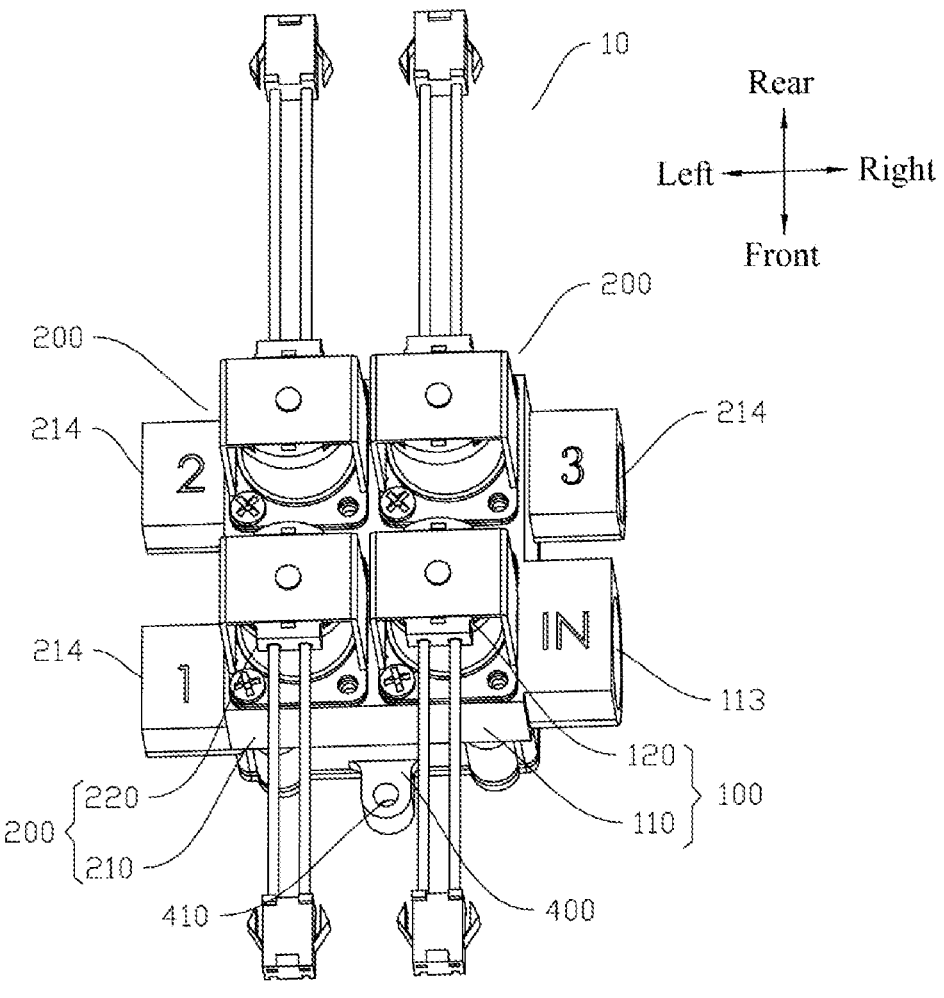
FIG. 1 is a stereoscopic diagram of a gas valve according to an embodiment of the present disclosure.

REFERENCE NUMERALS 10 refers to gas valve;

100 refers to intake valve assembly; 110 refers to intake valve body; 111 refers to gas inlet; 112 refers to intake valve mounting position; 113 refers to intake interface; 120 refers to intake valve core;

200 refers to outlet valve assembly; 210 refers to outlet valve body; 211 refers to gas outlet; 212 refers to outlet valve mounting position; 213 refers to outlet cavity; 214 refers to outlet interface; 220 refers to outlet valve core;

300 refers to valve cavity;

400 refers to mounting hanger; and 410 refers to mounting hole.

DETAILED DESCRIPTION OF THE DISCLOSURE

The embodiments of the present disclosure are described in detail hereinafter. Examples of the embodiments are shown in the accompanying drawings. The same or similar reference numerals throughout the accompanying drawings denote the same or similar elements or elements having the same or similar functions. The embodiments described hereinafter with reference to the accompanying drawings are exemplary and are only used to explain the present disclosure, but should not be understood as limiting the present disclosure.

In the description of the present disclosure, it is to be understood that the orientation or position relationship indicated by the terms "left", "right", "front", "rear", and the like is based on the orientation or position relationship shown in the accompanying drawings, it is only for the convenience of description of the present disclosure and simplification of the description, and it is not to indicate or imply that the indicated device or element must have a specific orientation, and be constructed and operated in a specific orientation. Therefore, the terms shall not be understood as limiting the present disclosure.

In the description of the present disclosure, if the terms "first", "second", and "third" are used for the purpose of distinguishing the features only in the description, and cannot be understood as indicating or implying relative importance, implicitly indicating the number of features indicated, or implicitly indicating the order of features indicated.

In the description of the present disclosure, the terms "arrangement", "installation", "connection" and the like are to be understood in broad sense unless otherwise specified and defined.

Figure 2:
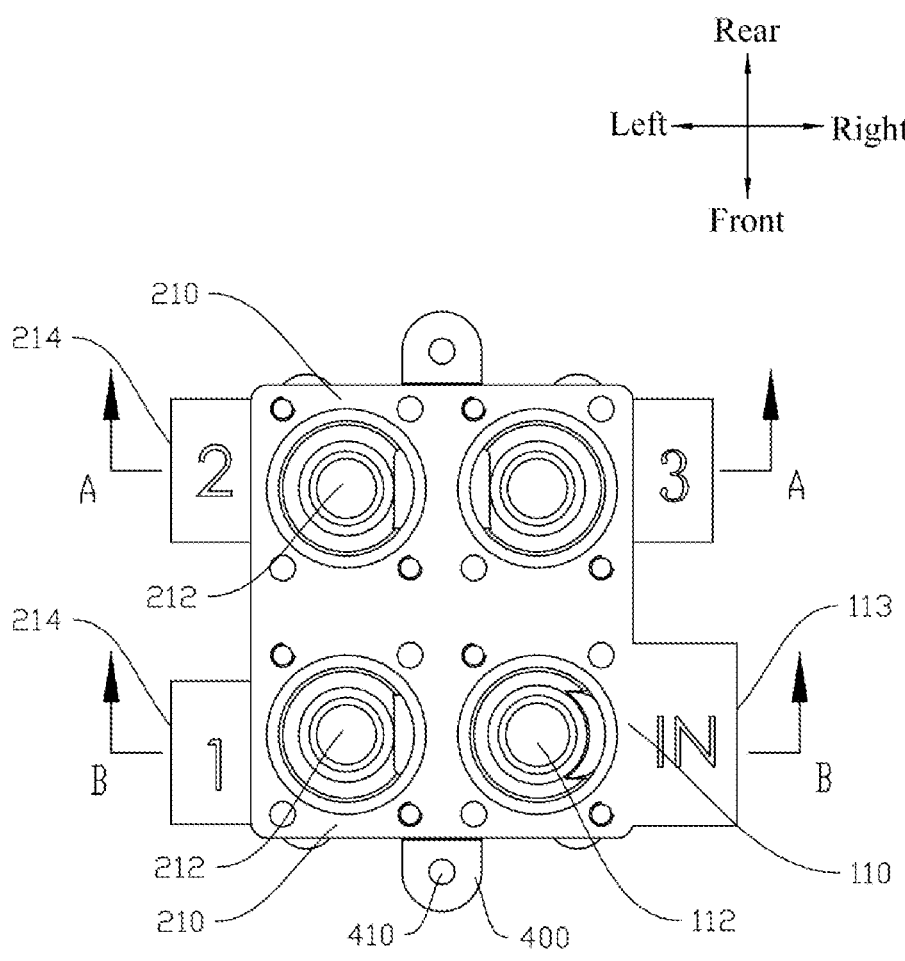
FIG. 2 is a top view of an intake valve body and an outlet valve body in FIG. 1.
Figure 3:
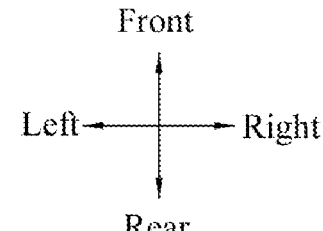
FIG. 3 is a bottom view of the intake valve body and the outlet valve body in FIG. 1.
Figure 3:
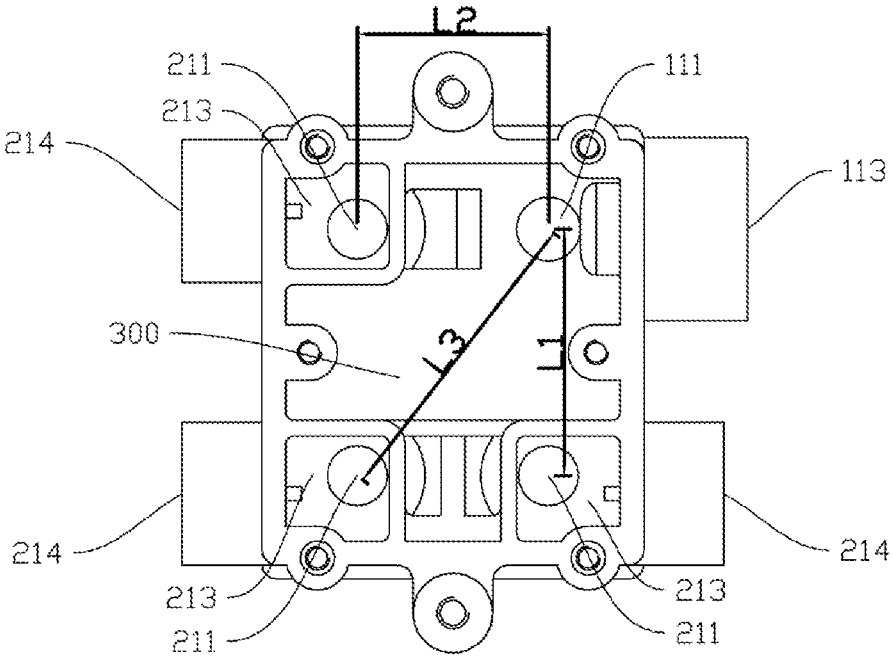

With reference to FIG. 1, FIG. 2, and FIG. 3, a gas valve 10 according to an embodiment of the present disclosure is applied to an oven, and the oven may be understood as a device heated through gas, such as a gas oven. The gas valve 10 according to the embodiment includes an intake valve assembly 100 and three outlet valve assemblies 200. It is to be noted that two, four, or more outlet valve assemblies 200 may be provided, and the number is not specifically limited herein. In the embodiment, three outlet valve assemblies 200 are taken as an example. Specifically, the intake valve assembly 100 includes an intake valve body 110 and an intake valve core 120. The intake valve body 110 is internally provided with a gas inlet 111, and the intake valve core 120 controls the gas inlet 111 to be opened or closed. Each outlet valve assembly 200 includes an outlet valve body 210 and an outlet valve core 220. Each outlet valve body 210 is internally provided with a gas outlet 211, the gas outlet 211 is respectively communicated with the gas inlet 111, and the outlet valve core 220 respectively controls the corresponding gas outlet 211 to be opened or closed. The intake valve body 110 is connected with the outlet valve body 210 and is formed with a valve cavity 300, and the gas outlet 211 is communicated with the gas inlet 111 through the valve cavity 300. It can be understood that gas enters the valve cavity 300 through the gas inlet 111, and is transported to the corresponding gas outlet 211 through the valve cavity 300 for discharging. Finally, the gas enters the corresponding burner through the gas circuit for combustion, thus implementing a heating function of a gas oven. Therefore, the gas valve 10 according to the embodiment of the present disclosure may perform dual control on a gas circuit of a burner correspondingly connected with each gas outlet 211 through the intake valve core 120 and the outlet valve core 220, thus performing dual protection on the gas circuit, and providing a high safety coefficient.

Further, in some embodiments of the present disclosure, gas outlets 211 are arranged around a periphery of the valve cavity 300, and a difference of distance between each gas outlet 211 and the gas inlet 111 is small, and a pressure loss is substantially the same after the gas is transported through each gas outlet 211 from the valve cavity 300 since the pressure loss at the gas outlet 211 is proportional to the distance between the gas outlet 211 and the gas inlet 111. Therefore, each gas outlet 211 of the gas valve 10 has a good pressure consistency, thus being suitable for high-power burners. It is to be noted that the gas outlet 211 is arranged around the periphery of the valve cavity 300, and the gas inlet 111 may be arranged around the periphery of the valve cavity 300, and a difference of distance between the gas inlet 111 and each gas outlet 211 is small. In addition, the gas inlet 111 may also be arranged at a center of the valve cavity 300, and a difference of distance between the gas inlet 111 and each gas outlet 211 is small.

With reference to FIG. 3, in some embodiments of the present disclosure, a linear distance between the gas inlet 111 and each gas outlet 211 is defined as a gas transmission length, and a difference between any two gas transmission lengths is less than or equal to a value of any gas transmission length. It is to be noted that, L1, L2, and L3 are respectively gas transmission lengths from three gas outlets 211 to the gas inlet 111. Compared with the existing gas valve 10, a difference between the first gas transmission length L1, the second gas transmission length L2, and the third gas transmission length L3 in the embodiment of the present disclosure is small, and a difference between any two gas transmission lengths is less than or equal to a scope of a value of any gas transmission length. Therefore, the pressure loss is substantially the same after the gas passes through each gas transmission length since the pressure loss at the gas outlet 211 is proportional to the corresponding gas transmission length. Therefore, each gas outlet 211 of the gas valve 10 has a good pressure consistency, thus being suitable for high-power burners.

With reference to FIG. 2 and FIG. 3, in some embodiments of the present disclosure, the intake valve body 110 and the outlet valve body 210 are of an integrated structure, and the intake valve body 110 is connected with the outlet valve body 210 more reliably, a sealing performance in the valve cavity 300 is better, a sealing performance of connection between the valve cavity 300 and the gas inlet 111 and the gas outlet 211 is also better, and a safety performance of the gas valve 10 is better. Moreover, spaces of the intake valve body 110 and the outlet valve body 210 can be reasonably utilized, and an overall size of the gas valve 10 is reduced.

With reference to FIG. 1 and FIG. 2, in some embodiments of the present disclosure, the intake valve body 110 and the outlet valve body 210 are located in a same plane, and the gas valve 10 is of a planar structure, layout between the intake valve body 110 and the outlet valve body 210 is more compact, the space may be utilized most reasonably, an overall size of the gas valve 10 is further reduced, and a height size of the gas valve 10 is smaller, thus being convenient for arrangement of burners and other components, and increasing a space utilization rate of the oven.

With reference to FIG. 1, in some embodiments of the present disclosure, three outlet valve assemblies 200 are provided, and the three outlet valve assemblies 200 and the intake valve assembly 100 are distributed in a Tin-word format. Specifically, three gas outlets 211 corresponding to the three outlet valve assemblies 200 and the gas inlet 111 are symmetrically arranged in left and right directions of the gas valve 10. That is to say, two gas outlets 211 are arranged on a left side of the gas valve 10, and the gas inlet 111 and another gas outlet 211 are arranged on a right side of the gas valve 10. In addition, three outlet valve cores 220 and the inlet valve core 120 are located above the gas valve 10 and distributed in a Tin-word format, and layout between the intake valve assembly 100 and the three outlet valve assemblies 200 is more compact, the spaces can be utilized most reasonably, and an overall size of the gas valve 10 is reduced by more than 30% compared with the existing gas valve 10.

Figure 5:
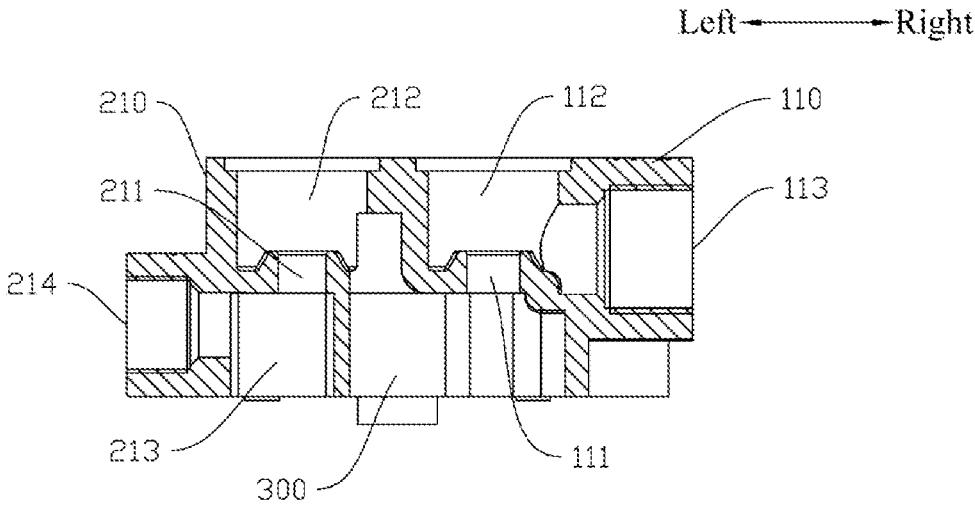
FIG. 5 is a cross-sectional view of a cross-section B-B in FIG. 2.

With reference to FIG. 2, FIG. 3, and FIG. 5, in some embodiments of the present disclosure, the intake valve body 110 is provided with an intake valve mounting position 112 and an intake interface 113, and an intake valve core 120 is mounted on the intake valve mounting position 112. Two ends of the intake valve core 120 are respectively communicated with the gas inlet 111 and the intake interface 113, and the intake interface 113 is connected with a gas pipeline (not shown in the drawings). The gas pipeline is connected with a gas source, and the intake valve core 120 is used for controlling the gas from the intake interface 113 to enter the valve cavity 300 through the gas inlet 111, and an intake structure of the gas valve 10 is more stable.

Figure 4:
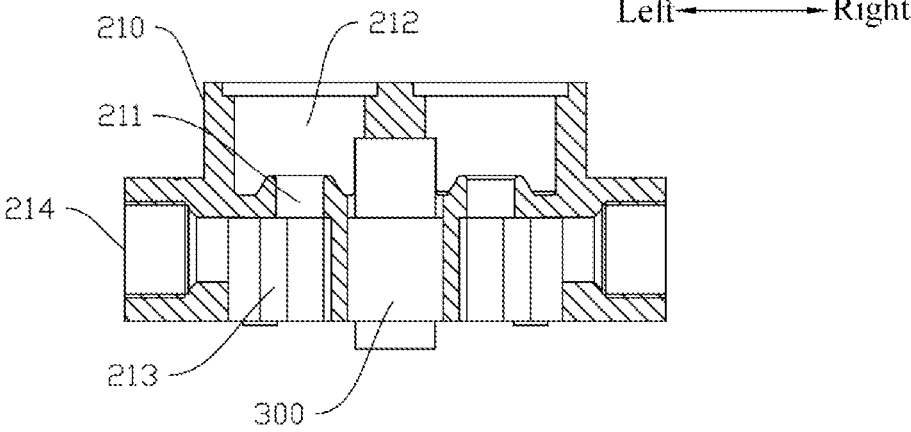
FIG. 4 is a cross-sectional view of a cross-section A-A in FIG. 2.

With reference to FIG. 2, FIG. 3, and FIG. 4, in some embodiments of the present disclosure, each outlet valve body 210 is provided with an outlet valve mounting position 212, and an outlet valve core 220 is correspondingly mounted on the outlet valve mounting position 212. Two ends of the outlet valve core 220 are respectively communicated with the gas outlet 111 and the valve cavity 300, the gas outlet 211 is connected with a burner through a pipeline (not shown in the drawings). The outlet valve core 220 is used for controlling the gas in the valve cavity 300 to enter the burner through the gas outlet 211, to transport the gas in the valve cavity 300 to the corresponding burner, thus making an outlet structure of the gas valve 10 more stable.

With reference to FIG. 1 and FIG. 3, in some embodiments of the present disclosure, an outlet cavity 213 communicated with the gas outlet 211 is defined in the outlet valve body 210, which avoids leakage of the gas at the gas outlet 211 caused by direct connection between the gas outlet 211 and the pipeline, and can effectively utilize the space of the outlet valve body 210 and reduce the overall size of the gas valve 10. A side wall of the outlet cavity 213 extends outwardly and is provided with an outlet interface 214, which facilitates connection between the pipeline connecting the burner and the gas outlet 211, and a sealing performance of connection between the gas outlet 211 and the pipeline is better.

In some embodiments of the present disclosure, the intake valve core 120 and the outlet valve core 220 are both electromagnetically controlled. That is to say, the gas valve 10 is controlled by an electromagnetic valve. The electromagnetic valve has the advantages of good leakproofness, quick response, safe use, and low production cost, and can effectively improve a control performance of the gas valve 10.

With reference to FIG. 1 and FIG. 2, in some embodiments of the present disclosure, the gas valve 10 is also provided with a mounting hanger 400, which is convenient for mounting the gas valve 10 on the oven, and improves an assembly efficiency. Further, two mounting hangers 400 are provided, and the two mounting hangers 400 are respectively arranged at two opposite ends of the gas valve 10, such as front and rear ends in FIG. 1. The mounting hanger 400 is provided with a mounting hole 410, and a fixing member such as a screw may be inserted through the mounting hole 410 to mount the gas valve 10 on the oven stably.

An oven according to an embodiment of the present disclosure includes the gas valve 10 according to the above embodiment. According to the oven of the embodiment, the intake valve assembly 100 with the intake valve body 110 and the intake valve core 120, and the outlet valve assembly 200 with the outlet valve body 210 and the outlet valve core 220 are arranged through the gas valve 10, the intake valve body 110 is connected with the outlet valve body 210 and is formed with the valve cavity 300, the gas outlet 211 is communicated with the gas inlet 111 through the valve cavity 300, and the intake valve core 120 and the outlet valve core 220 respectively control the gas inlet 111 and the gas outlet 211 to be opened and closed, and gas circuits of burners are all subjected to dual control through the intake valve core 120 and the outlet valve core 220, thus having a high safety coefficient, and improving a safety performance of the oven. Moreover, gas outlets 211 are arranged around the periphery of the valve cavity 300, and a difference of distance between each gas outlet 211 and the gas inlet 111 is small, and each gas outlet 211 has a good pressure consistency, thus being suitable for high-power burners.

What is claimed is:
1. A gas valve, comprising:
an intake valve assembly comprising an intake valve body and an intake valve core, wherein the intake valve body is internally provided with a gas inlet, and the intake valve core is configured to control the gas inlet to be opened or closed; and
multiple outlet valve assemblies, each outlet valve assembly comprising an outlet valve body and an outlet valve core, wherein the outlet valve body is internally provided with a gas outlet, each gas outlet is respectively communicated with the gas inlet, and the outlet valve core is configured to control a corresponding gas outlet to be opened or closed independently from the other gas outlets;

wherein the intake valve body is connected with the outlet valve body and is formed with a valve cavity, each gas outlet is communicated with the gas inlet through the valve cavity, and the gas outlet is arranged around a periphery of the valve cavity;

wherein each outlet valve core of the multiple outlet valve assemblies has same diameter;

wherein when three outlet valve assemblies are provided, the three outlet valve assemblies and the intake valve assembly are arranged in a square arrangement.

2. The gas valve according to claim 1, wherein a linear distance between the gas inlet and the gas outlet is defined as a gas transmission length, and a difference between any two gas transmission lengths is less than or equal to a value of any gas transmission length.

3. The gas valve according to claim 1, wherein the intake valve body and the outlet valve body are of an integrated structure.

4. The gas valve according to claim 1, wherein the intake valve body and the outlet valve body are located in a same plane.

5. The gas valve according to claim 1, wherein the intake valve body is provided with a recess for mounting an intake valve and an intake interface, the intake valve core is mounted on the intake valve mounting position, and two ends of the intake valve core are respectively communicated with the gas inlet and the intake interface.

6. The gas valve according to claim 1, wherein the outlet valve body is provided with an outlet valve mounting position, the outlet valve core is correspondingly mounted on the outlet valve mounting position, and two ends of the outlet valve core are respectively communicated with the gas outlet and the valve cavity.

7. The gas valve according to claim 6, wherein an outlet cavity communicated with the gas outlet is defined in the outlet valve body, and a side wall of the outlet cavity extends outwardly and is provided with an outlet interface.

8. The gas valve according to claim 1, wherein the intake valve core and the outlet valve core are both electromagnetically controlled.

\* \* \* \* \*